2,559,268

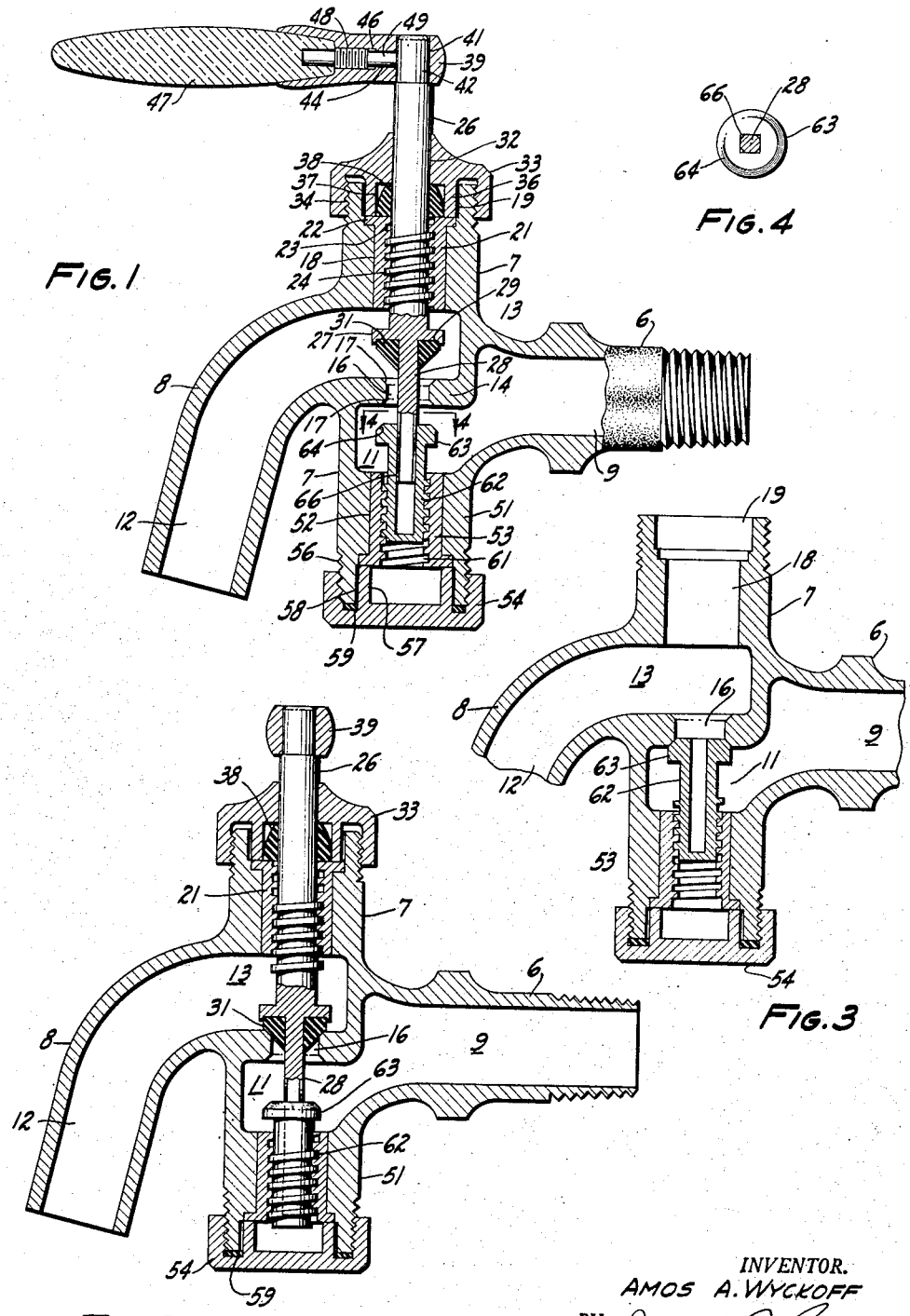
July 3, 1951 — A. A. WYCKOFF — 2,559,268
FAUCET
Filed Jan. 26, 1946
INVENTOR.
AMOS A. WYCKOFF
BY Joseph B. Gardner
his ATTORNEY Patented July 3, 1951

UNITED STATES PATENT OFFICE 2,559,268

FAUCET

Amos A. Wyckoff, Oakland, Calif.

Application January 26, 1946, Serial No. 643,530

3 Claims. (Cl. 277—29)

1

This invention relates to shut-off valves or faucets used in controlling the flow of water or other fluid substances.

An object of the invention is to provide a faucet fitted with auxiliary shut-off means which is selectively operative to effect interruption of fluid flow in the event that dismantling of the faucet structure from the body, for repair or replacement, should become necessary.

Another object of the invention is to provide mechanism associated with a fluid control device which functions to fully shut off flow through the device when the latter is regulated beyond its full open position.

A further object of the invention is to provide, in a faucet of the character described equipped with a service valve functioning to effect ordinary openings and closings of the faucet and an auxiliary shut-off valve which functions to interrupt fluid flow through the faucet in the event that removal of the service valve should be required, means to effect positive and secure closing of the auxiliary shut-off valve so that it may not be thereafter opened until the removed service valve is replaced.

Still another object of the invention is to provide in a faucet of the character described equipped with an auxiliary shut-off valve operative in conjunction with the regular service valve, means permitting variations in the relationship between the service and shut-off valves so that the volume of flow through the faucet when the latter is in full open position may be selectively regulated.

A still further object of the invention is to provide, in a faucet of the type referred to which is fitted with auxiliary shut-off means, interchangeability of certain of the parts so that the operating handle and stem of the faucet may be positioned, if desired, in upwardly or downwardly directed relationship with the faucet body.

Yet another object of the invention is to provide an improved readily adjustable operating handle for the type of faucet generally described herein.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

2

Referring to the drawing:

Figure 1 is a vertical sectional view of a faucet showing the improved structure of my invention incorporated therein. The valves in this view are shown in their open positions.

Figure 2 is a view, similar to Figure 1, showing the positions of the operating parts when the service valve is closed.

Figure 3 is a similar vertical sectional view, broken away in parts to conserve space in the drawing, showing the auxiliary shut-off valve closed and the service valve parts removed.

Figure 4 is a horizontal sectional view taken in the plane indicated by the line 4—4 of Figure 1.

In the conventional forms of valves and faucets, the construction is such that when repacking of the valve stem or replacement of the valve face washer are required, closing of a main or auxiliary shut-off valve in the pressure line must be accomplished before it is safe to dismantle the faulty valve for repair. In many instances the main shut-off valve is located a considerable distance from the valve or faucet it is desired to repair and not a little time is lost in the two intervals preceding and following the actual repair time in closing and re-opening the shut-off valve. In other instances, where the faulty valve or faucet comprises one of a group thereof controlled by the same shut-off valve, closing of the latter during the time necessary to complete the repairs will inactivate all of the valves in the group and possibly create considerable inconvenience or loss of time in operations dependent upon continuous operation of the valves or faucets.

I have provided means whereby each valve or faucet can be made to function as its own main line shut-off so that, if desired, repairs may be carried on therein without affecting the usual shut-off valve or any other valve or faucet which may be included in the same group or circuit as the one under repair. In detail, I provide a valve or faucet body comprising the usual internally or externally threaded socket or stem 6, by means of which the body may be threadedly attached to a container, pipe line or other source of fluid under pressure. In this case the stem 6 intersects and is formed integrally with an axially vertical cylindrical stem housing 7 from the forward side of which projects a spout 8 or other such element. The stem 6 is provided with an internal flow passage 9, which opens into a chamber 11 formed internally of the housing 7, and the spout 8 has therein a discharge passage 12 which opens into a chamber 13 formed in the housing 7 and positioned above the chamber 11. A wall 14 separates the two chambers 11 and 13 and is provided with an aperture 16 axially aligned with the housing 7 through which the chambers 11 and 13 are in communication. Chamfers are provided at each end of the aperture 16 to form upper and lower valve seats 17. It will be seen that fluid from the passage 9 may flow into the chamber 11 through the aperture 16, into the chamber 13 and thence through the discharge passage 12.

Means is provided for opening or closing the aperture 16 so as to control, as desired, the flow of fluid therethrough. Extending axially of the upper portion of the housing 7 is a bore 18 axially concentric with the aperture 16 and having an enlarged counterbore 19 at its upper end. A sleeve 21 slidably fitting in the bore, and having an enlarged end flange 22 seated at the bottom of the counterbore 19, is provided with a threaded bore 23 to receive the complementary threads 24 formed on a rotatable stem 26 which extends toward the aperture 16 and is provided with an integral collar 27 from which a square stud 28 extends and passes concentrically through the aperture 16. The face of the collar 27 confronting the aperture 16 is provided with a circular recess 29 and a rubber washer or plug 31, which is slipped over the stud 28 in snug engagement therewith, seats in the recess 29. The plug 31 has a conical end surface which is complementary with the valve seats 17. The stem 26 is continued upwardly beyond the threads 24 and is extended considerably beyond the upper end of the housing 7 through a bore 32 formed centrally of an upper cap 33 which is connected with the housing by means of screw threads 34. The cap is provided with an integral annular projection 36 extending downwardly into the counterbore 19 and engaging the flange 22 of the sleeve 21 so as to clamp the latter against axial or rotational movement. The recess 37 of the projection 36 contains a rubber packing ring 38 surrounding the stem 26 and which, by screwing downwardly on the cap 33, may be compressed and tightened about the stem so as to preclude the leakage of any fluid past the threads 23—24 and outwardly through the bore 32.

Means for operating the faucet is provided in a handle comprising a hub 39 provided with an aperture 41 in which the diametrically reduced end portion 42 of the stem is movably engaged. The hub 39 is provided with an axial bore 44, rectangularly intersecting the aperture 41, and with a diametrically enlarged counterbore 46 at the outer end thereof. A handle 47 has a portion thereof entering the counterbore 46 and is provided with an extended threaded stem 48 engaging mating threads provided in a medial portion of the bore 44 and further provided with an integral stud 49 extended to engage the periphery of the end portion 42 of the stem 26. The arrangement of the parts is such that by manually rotating the handle 47 so as to retract the stud 49, the handle assembly may be moved independently of the stem to any desired circumferential position relative to the latter and subsequently tightly engaged with the stem by counter-rotation of the handle to forcibly press the stud 49 against the stem portion 42. This provides for rapid adjustability of the handle position in order to compensate for wear in the valve washer 31. Rotation of the stem 26 by the handle will of course cause the stem to rise or descend in the threaded sleeve 21 which will effect corresponding movement in the valve washer 31 to open or close the valve and to control the flow of fluid from the passage 9 through the aperture 16 into the discharge passage 12.

Means is provided for closing the valve aperture or port 16 when the valve 31 is moved a predetermined distance beyond its full open position. Formed integrally with the valve body and extending oppositely to and in co-axial alignment with the housing 7 is a similar housing 51 having a central bore 52 in which a threaded sleeve 53 is positioned. A cap 54 engaging threads 56 formed on the end portion of the housing has a tubular extension 57 entering the counterbore 58 of the housing bore 52 and engaged with the end of the sleeve 53 so as to securely clamp the latter against axial and rotational movement relative to the housing. A gasket 59 positioned between the housing and cap prevents leakage of fluid exteriorly of the faucet. Engaging the threads 61 of the sleeve 53 is a threaded plug 62 having at its upper end a valve head 63 confronting and axially concentric with the valve aperture or port 16 and provided with a peripheral chamfer 64 mating with the chamfer 17 of the port. The plug 63 is further provided with an axial recess 66 of rectangular cross-sectional form in which the similarly shaped stem 28 is slidably engaged. In Figure 1 the faucet is shown in its full open position wherein a maximum flow of fluid may pass through the port 16 by reason of the fact that the valves 31 and 63 are equidistantly spaced from their respective seats. It will be seen however that if the stem 26 is rotated by its handle to further elevate the valve 31 the valve 63, due to its interconnection with the valve 31 by the stem 28, will be correspondingly elevated until it is fully seated to close the port 16. When this condition obtains, the cap 33 may be removed and the valve stem 26 and sleeve 21 may be withdrawn from the faucet body for repair or replacement of parts without any danger of fluid leakage since the pressure passage 9 will be tightly closed by the seated valve 63. After the required operations have been performed on the removed faucet parts, normal operating conditions may be restored by reinserting the assembled valve unit to again re-engage the stem 28 in the recess 66 whereupon the cap 33 is tightly secured in threaded relation with the housing 7. The stem 28 is provided with flattened corners as shown in Figure 4 so as to provide vents in the recess 66 through which any fluid trapped in the recess may escape into the chamber 11. By rapid movement of the valve handle, the valve 63 is unseated and the valve 31 brought to seat over the port to shut off the further flow of fluid which occurred during the interval when the transfer of the closure function between the valves 63 and 31 was taking place.

It will be noted that fluid pressure from the passage 9 is applied to the main valve 31 on the seating face thereof. This serves to prevent annoying "water hammer" which occurs in a great many valves of ordinary design and which is caused by relative looseness between the stem threads and those of the mating threaded part and also by radial play in the stem packing and its associated cap nut. It will also be seen that the valve washer 31 requires no mounting screw or other such element to secure it in place, the only operations required in changing the washer being to slip the old one axially from the stem 28 and to slip a new one in place by reversing the procedure. It will further be seen that the faucet of my invention can be adjusted to provide for a certain predetermined degree of full opening so that it is possible to obtain all or a portion of the flow which the fluid main is capable of delivering. In many installations particularly in wash basins not equipped in their water lines with pressure regulating valves, an accidental or intentional full opening of the faucet will cause a forceful discharge into the basin which will usually result in splashing water out of the basin and over the surfaces of the adjacent wall and the surrounding floor not to mention the objectionable wetting of the clothing of the person or persons who may be present in front of or adjacent to the basin. The regulation of flow in the present faucet is accomplished by varying the relative spacing between the valves 31 and 63. This is done, when assembling the upper or service valve parts and while the lower or auxiliary valve 63 is closed, by rotating the sleeve 21 relative to and independently of the valve stem so as to cause the latter to move, without rotation, toward or from the valve 63 as desired. Thus the full open position of either valve will be equivalent to half of the aggregate distances between the valves and their respective seats. It will be seen therefore that when such full open position is reached, by the service valve 31 for instance, a further opening of the valve will not be permissible since any receding of the valve 31 away from its seat will be countered by a similar degree of movement of the valve 63 toward its seat to correspondingly decrease the flow of fluid through the port 16. At this point it may be mentioned that should there be any slight inequalities in pitch between the threads of the stem 26 and those of the stud 62, the slidable stem 29 will compensate for the unequal movements between the parts. It will further be seen that the housings 7 and 51 are duplicates as far as design is concerned and that the parts of one will fit into the receiving elements of the other. This makes it possible to reverse the positions of the parts if desired so that the stem 26 and handle assembly associated therewith may be made to operate from the bottom of the faucet.

I claim:

1. A faucet comprising a body having therein a valve port including two valve seats, a bonnet threadedly engaged to said body, a sleeve interposed between and capable of rotational adjustment relative to said bonnet and body, means on said sleeve interposed between portions of said bonnet and body for securing the sleeve in a selected position of rotational adjustment thereof, and a stem threadedly engaged in said sleeve and carrying a first valve movable upon rotation of the stem selectively toward or from one of said valve seats, a second valve also movable upon rotation of said stem selectively toward or from the other of said valve seats, and means interconnecting said valves for duplicating in each valve the movements of the other valve.

2. A faucet comprising a body having therein passages intercommunicating through a valve port, a bonnet threadedly engaged to said body, a sleeve interposed between and capable of rotational adjustment relative to said bonnet and body, means for securing the sleeve in a selected position of rotational adjustment thereof, a stem threadedly engaged in said sleeve and carrying a first valve movable upon rotation of the stem selectively toward or from said valve port, a plug threadedly engaged in said body and having thereon a valve head movable rotatably and axially toward or from said valve port, and means interconnecting said first and second valves for duplicating in each valve the movements of the other valve.

3. A faucet comprising a body having therein passages intercommunicating through a valve port, a bonnet threadedly engaged to said body, a first sleeve interposed between and capable of rotational adjustment relative to said bonnet and body, means for securing said first sleeve in a selected position of rotational adjustment thereof, a stem threadedly engaged in said first sleeve and carrying a first valve movable upon rotation of the stem selectively toward or from said valve port, a cap threadedly engaged to said body, a second sleeve interposed between and capable of rotational adjustment relative to said cap and body, means for securing said second sleeve in a selected position of rotational adjustment thereof, a plug threadedly engaged in said second sleeve and having thereon a valve head movable rotatably and axially toward or from said valve port, and means inter-connecting said first and second valves for duplicating in each valve the movements of the other valve.

AMOS A. WYCKOFF.

REFERENCES CITED

The following references are of record in the file of this patent:

UNITED STATES PATENTS

| Number | Name | Date |
|---|---|---|
| 1,833,653 | Martin | Nov. 24, 1931 |
| 1,876,246 | King | Jan. 15, 1932 |
| 2,244,993 | Hollifield | June 10, 1941 |
| 2,300,406 | Curtis | Nov. 3, 1942 |

FOREIGN PATENTS

| Number | Country | Date |
|---|---|---|
| 170,649 | Great Britain | Oct. 24, 1921 |